United States Patent
Ma et al.

(10) Patent No.: US 10,345,940 B2
(45) Date of Patent: Jul. 9, 2019

(54) SCANNING CIRCUIT, DRIVE CIRCUIT AND TOUCH DISPLAY DEVICE

(71) Applicant: SHANGHAI TIANMA MICRO-ELECTRONICS CO., LTD., Shanghai (CN)

(72) Inventors: Conghua Ma, Shanghai (CN); Kang Yang, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 1 day.

(21) Appl. No.: 15/724,167

(22) Filed: Oct. 3, 2017

(65) Prior Publication Data

US 2019/0004643 A1    Jan. 3, 2019

(30) Foreign Application Priority Data

Jun. 29, 2017    (CN) .......................... 2017 1 0516356

(51) Int. Cl.
*G09G 3/3266*    (2016.01)
*G06F 3/041*    (2006.01)
*G09G 3/20*    (2006.01)
*G09G 3/36*    (2006.01)

(52) U.S. Cl.
CPC .......... *G06F 3/0412* (2013.01); *G06F 3/0416* (2013.01); *G09G 3/20* (2013.01); *G09G 3/2092* (2013.01); *G09G 3/3266* (2013.01); *G09G 3/3674* (2013.01); *G09G 2310/0267* (2013.01); *G09G 2310/08* (2013.01)

(58) Field of Classification Search
CPC .................................................. G09G 3/3266
See application file for complete search history.

(56) References Cited

U.S. PATENT DOCUMENTS

| 2006/0215102 | A1 | 9/2006 | Otose et al. | |
| 2012/0056835 | A1* | 3/2012 | Choo | G06F 3/0412 |
| | | | | 345/173 |
| 2016/0049126 | A1 | 2/2016 | Zhang et al. | |
| 2017/0084238 | A1* | 3/2017 | Cao | G09G 3/3266 |
| 2018/0158425 | A1* | 6/2018 | Gong | G09G 3/3266 |
| 2018/0190178 | A1* | 7/2018 | Hong | G09G 3/3266 |

FOREIGN PATENT DOCUMENTS

CN    104392687 A    3/2015

OTHER PUBLICATIONS

German Office Action dated Feb. 15, 2018.

\* cited by examiner

*Primary Examiner* — Hang Lin
(74) *Attorney, Agent, or Firm* — Alston & Bird LLP

(57) ABSTRACT

A scanning circuit, a drive circuit and a touch display device are provided. The scanning circuit drives a pixel row in a one-to-one manner. The scanning circuit includes: an input module, configured to generate a scanning signal in response to an inputted starting signal; a latch module, electrically connected to the input module and configured to generate the starting signal in response to the scanning signal and latch the starting signal; and a gating module, electrically connected to the latch module and configured to perform a display scanning on the pixel row driven by the scanning circuit under a control of the starting signal in a display stage and suspend the display scanning on the pixel row driven by the scanning circuit under the control of the starting signal in a touch stage.

8 Claims, 13 Drawing Sheets

SCANNING CIRCUIT, DRIVE CIRCUIT AND TOUCH DISPLAY DEVICE

The present application claims priority to Chinese Patent Application No. CN201710516356.4, titled "SCANNING CIRCUIT, DRIVE CIRCUIT AND TOUCH DISPLAY DEVICE", filed with the Chinese State Intellectual Property Office on Jun. 29, 2017, which is incorporated herein by reference in its entirety.

FIELD

The present disclosure relates to the technical field of driving a display, and particularly to a scanning circuit, a drive circuit and a touch display device.

BACKGROUND

Nowadays, in an array substrate of a display device, a gate drive circuit is generally adopted for scanning pixel cells. The gate drive circuit is formed by multiple cascaded stages in a scanning circuit. Each stage of the scanning circuit powers a pixel row, to scan and to drive the pixel row for display in a display process and to provide a starting signal for the next stage of a scanning circuit, thereby scanning the pixel rows in a one by one mode. Touch display devices are gradually used with the development of display technology. A currently used touch display device is generally driven in a time-sharing manner, i.e., a driving process for the touch display device is divided into a display stage and a touch stage. In the display stage, the pixel cells are scanned to be driven for display, and in the touch stage, touch structures are scanned to be driven. The two stages should be completed independently without affecting each other. However, a scanning circuit of an existing touch display device is often not suspended in the touch stage, causing an interfered display effect.

SUMMARY

A scanning circuit, a drive circuit and a touch display device are provided according to the present disclosure. By arranging a gating module in the scanning circuit, the scanning circuit performs a display scanning on a pixel row under a control of a starting signal in a display stage and suspends the display scanning on the pixel row under the control of the starting signal in a touch stage, so as to ensure that the display scanning is suspended by the scanning circuit in the touch stage and ensure a normal display of the touch display device.

A scanning circuit is applied in a touch display device including multiple pixel rows. The scanning circuit corresponds to one of the pixel rows, and includes an input module, configured to generate a scanning signal in response to an inputted starting signal; a latch module, electrically connected to the input module, and configured to generate and latch a starting signal the same as the inputted starting signal in response to the scanning signal and latch the starting signal; and a gating module, electrically connected to the latch module and configured to perform a display scanning on the pixel row corresponding to the scanning circuit under a control of the starting signal in a display stage and suspend the display scanning on the pixel row corresponding to the scanning circuit under the control of the starting signal in a touch stage.

Accordingly, it is further provided, according to the present disclosure, a drive circuit which is applied in a touch display device including multiple pixel rows. The drive circuit includes multiple stages of the above scanning circuits. The scanning circuits correspond to the pixel rows in a one-to-one manner.

Accordingly, a touch display device is further provided according to the present disclosure. The touch display device includes the above drive circuit.

Compared with conventional technologies, the technical solutions according to the present disclosure have at least the following advantages.

A scanning circuit, a drive circuit and a touch display device are provided according to the present disclosure. The touch display device includes multiple pixel rows and the scanning circuit corresponds to a pixel row. The scanning circuit includes: an input module configured to generate a scanning signal in response to an inputted starting signal, a latch module electrically connected to the input module and configured to generate the starting signal in response to the scanning signal and to latch the starting signal. The scanning circuit also includes a gating module electrically connected to the latch module and configured to perform a display scanning on the pixel row under a control of the starting signal at a display stage Meanwhile it suspends the display scanning on the pixel row under the control of the starting signal at a touch stage. According to the present disclosure, by arranging the gating module in the scanning circuit, the scanning circuit performs the display scanning on the pixel row under the control of the starting signal in the display stage and suspends the display scanning on the pixel row under the control of the starting signal in the touch stage. Thus, the display scanning is suspended by the scanning circuit in the touch stage and ensured a normal display of the touch display device.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments of the present disclosure without any creative work fall within the scope of protection of the present disclosure.

As described in the background, touch display technologies are gradually used more by people, most today's touch display devices are generally driven in a time-sharing manner, i.e., a driving process for the touch display device is divided into a display stage and a touch stage. In the display stage, the pixel cells are scanned to be driven for display, and in the touch stage, touch structures are scanned to be driven. The two stages should be completed independently without affecting each other. However, a scanning circuit of an existing touch display device is not suspended during the touch stage, causing a poor display effect.

A scanning circuit, a drive circuit and a touch display device are provided according to embodiments of the present disclosure. By arranging a gating module in the scanning circuit, the scanning circuit performs a display scanning on a pixel row under a control of a starting signal in a display stage and suspends the display scanning on the pixel row under the control of the starting signal in a touch stage, to ensure that the display scanning is suspended by the scanning circuit in the touch stage and a normal display of the touch display device is achieved. In order to achieve the above objects, the technical solutions according to the embodiments of the present application are described in detail with reference to FIGS. 1 to 9 hereinafter.

Figure 1:
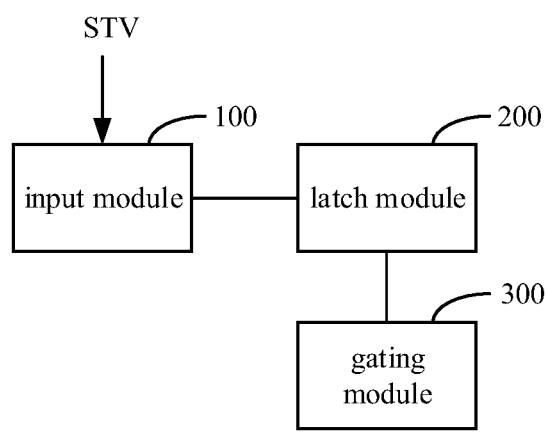
FIG. 1 is a schematic diagram of a scanning circuit according to an embodiment of the present disclosure.

Reference is made to FIG. 1 which is a schematic block diagram of a scanning circuit according to an embodiment of the present disclosure. The scanning circuit is applied in a touch display device including multiple pixel rows and corresponds to a pixel row. The scanning circuit includes an input module 100, a latch module 200 electrically connected to the input module 100 and a gating module 300 electrically connected to the latch module 200.

The input module 100 is configured to generate a scanning signal in response to an inputted starting signal STV.

The latch module 200 is configured to generate a starting signal STV the same as the inputted starting signal in response to the scanning signal and latch the starting signal STV.

The gating module 300 is configured to perform a display scanning on the pixel row driven by the scanning circuit under a control of the starting signal in a display stage and suspend the display scanning on the pixel row driven by the scanning circuit under the control of the starting signal in a touch stage.

It should be noted that, the touch display device according to the embodiment of the present disclosure may be a liquid crystal touch display device or an organic electro-luminescent display device, which is not limited herein. Furthermore, an array substrate of the touch display device according to the embodiment of the present disclosure may be an array substrate made by using a low-temperature polysilicon technology, which is not limited herein.

In an embodiment of the present disclosure, in a case that the touch display device is a liquid crystal display device, a pixel row of a gate line. Thus, the scanning circuit is electrically connected to the gate line, that is, the scanning circuit includes one output port. In a case that the touch display device is an organic electro-luminescent display device, a pixel cell is arranged with a pixel circuit and corresponds to multiple scanning lines. Thus, the scanning circuit is electrically connected to the multiple scanning lines, that is, the scanning circuit includes multiple output ports.

As can be seen from the above contents, in the technical solutions according to the embodiment of the present disclosure, by arranging the gating module in the scanning circuit, the scanning circuit performs the display scanning on the pixel row under the control of the starting signal in the display stage (i.e., starting a display scanning timing sequence of the scanning circuit) and suspends the display scanning on the pixel row under the control of the starting signal in the touch stage (i.e., suspending the display scanning timing sequence of the scanning circuit), so as to ensure that the display scanning is suspended by the scanning circuit in the touch stage and ensure a normal display of the touch display device.

In the following, a structure of a scanning circuit according to embodiments of the present disclosure is described with reference to FIG. 2 to FIG. 6.

Figure 2:
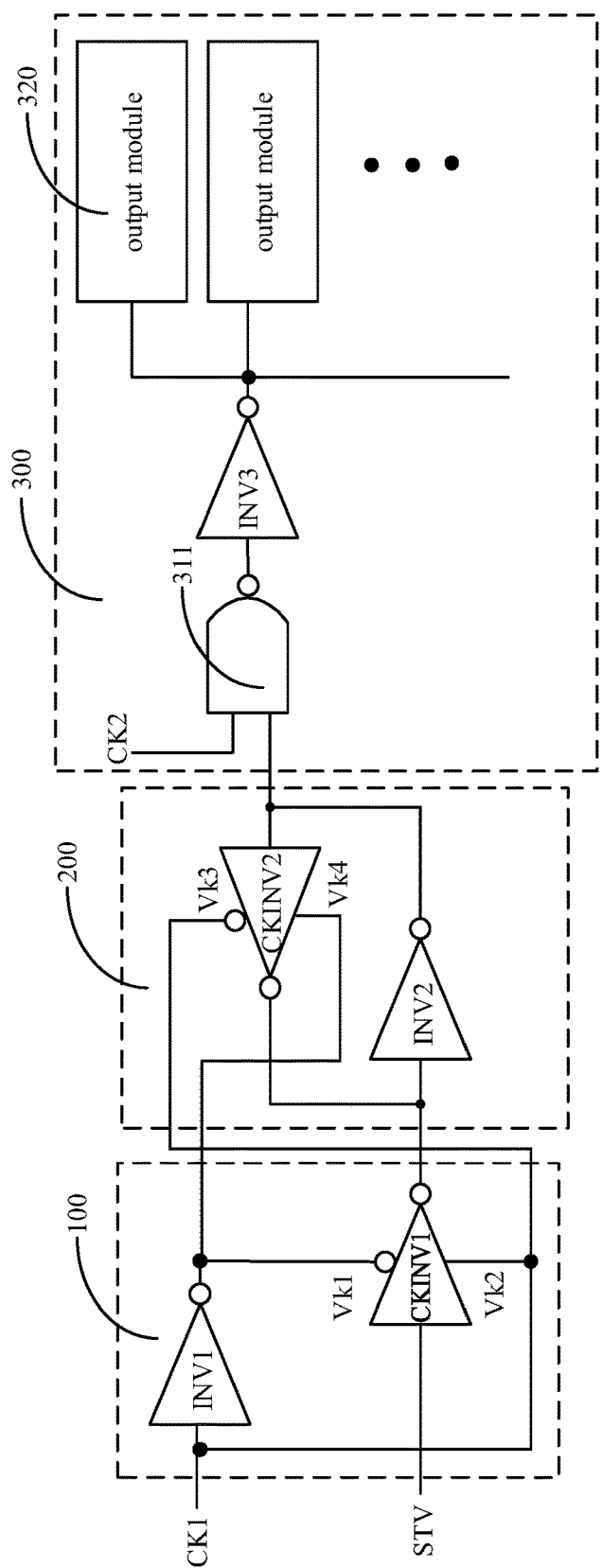
FIG. 2 is a schematic block diagram of a scanning circuit according to an embodiment of the present disclosure.

Reference is made to FIG. 2, which is a schematic diagram of a scanning circuit according to an embodiment of the present disclosure. In the embodiment, the input module 100 includes a first clock inverter CKINV1.

An input end of the first clock inverter CKINV1 is inputted with the starting signal STV. An output end of the first clock inverter CKINV1 is electrically connected to the latch module 200. A first control end of the first clock inverter CKINV1 is inputted with a first control signal Vk1 and a second control end of the first clock inverter CKINV1 is inputted with a second control signal Vk2, with the first control signal Vk1 and the second control signal Vk2 having opposite electrical levels.

In an embodiment of the present disclosure, the first control signal Vk1 and the second control signal Vk2 may be provided respectively by two signal lines with opposite electrical levels. Alternatively, in order to reduce wiring, the first control signal Vk1 and the second control signal Vk2 may be realized by an inverter due to their opposite electrical levels, that is, referring to FIG. 2, the input module 100 further includes a first inverter INV1.

An input end of the first inverter INV1 and the second control end of the first clock inverter CKINV1 are both electrically connected to a first clock signal end CK1, and an output end of the first inverter INV1 is electrically connected to the first control end of the first clock inverter CKINV1.

Referring to FIG. 2, the latch module 200 according to the embodiment of the present disclosure includes a second inverter INV2 and a second clock inverter CKINV2.

An input end of the second inverter INV2 and an output end of the second clock inverter CKINV2 are both electrically connected to the input module 100. An output end of the second inverter INV2 and an input end of the second clock inverter CKINV2 are both electrically connected to the gating module 300. A first control end of the second clock inverter CKINV2 is inputted with a third control signal Vk3 and a second control end of the second clock inverter CKINV2 is inputted with a fourth control signal Vk4, with the third control signal Vk3 and the fourth control signal Vk4 having opposite electrical levels.

In an embodiment of the present disclosure, the third control signal Vk3 and the fourth control signal Vk4 may be provided respectively by two signal lines with opposite electrical levels. Alternatively, in order to reduce wiring, the third control signal Vk3 and the fourth control signal Vk4 may be realized by an inverter due to their opposite electrical levels. Furthermore, in order to reduce the number of components, the third control signal Vk3 and the fourth control signal Vk4 may be realized by the first inverter INV1 of the input module 100. As shown in FIG. 2, in a case that the input module 100 includes the first inverter INV1, the first control end of the second clock inverter CKINV1 is electrically connected to the first clock signal end CK1, and the second control end of the second clock inverter CKINV2 is electrically connected to the output end of the first inverter INV1.

An active control level for the first control end of the second clock inverter CKINV2 is the same as an active control level for the first control end of the first clock inverter CKINV1, and an active control level for the second control end of the second clock inverter CKINV2 is the same as an active control level for the second control end of the first clock inverter CKINV1.

It should be noted that the active level is a level for switching on a component. For example, in the case that the first control ends of the first clock inverter CKINV1 and second clock inverter CKINV2 are low level control ends while the second control ends of the first clock inverter CKINV1 and second clock inverter CKINV2 are high level control ends, the active levels of the first control signal Vk1 and third control signal Vk3 are low levels, and the active levels of the second control signal Vk2 and fourth control signal Vk4 are high levels. Therefore, the first clock inverter CKINV1 and second clock inverter CKINV2 are switched on under the control of the active levels.

Referring to FIG. 2, the gating module 300 according to the embodiment of the present disclosure includes a first NAND gate 311, a third inverter INV3 and at least one output module 320.

A first input end of the first NAND gate 311 is electrically connected to the latch module 200, a second input end of the first NAND gate 311 is electrically connected to a second clock signal end CK2, and an output end of the first NAND gate 311 is electrically connected to an input end of the third inverter INV3. An output end of the third inverter INV3 is electrically connected to the output module 320, and the output module 320 is electrically connected to the pixel row driven by the scanning circuit.

In an embodiment of the present disclosure, the output module according to the present disclosure includes a second NAND gate. A first input end of the second NAND gate is electrically connected to the output end of the third inverter INV3, a second input end of the second NAND gate is electrically connected to a clock signal end, and an output end of the second NAND gate is electrically connected to the pixel row driven by the scanning circuit.

Alternatively, the output module includes an output port electrically connected between the output port of the third inverter INV3 and the pixel row driven by the scanning circuit.

Figure 3A:
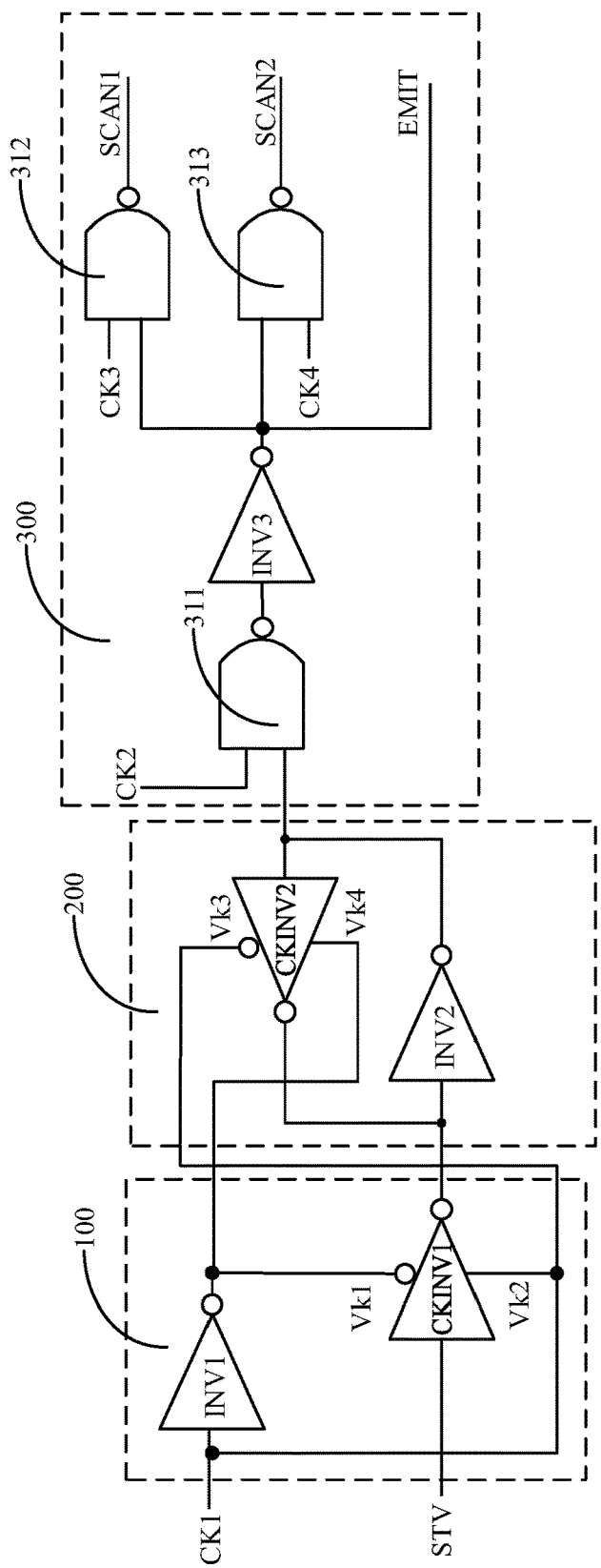
FIG. 3a is a schematic block diagram of a scanning circuit according to an embodiment of the present disclosure.

In the following, the scanning circuit and gating module according to the embodiment of the present disclosure are described in detail by taking a scanning circuit of the organic electro-luminescent display device an example. Referring to FIG. 3a, which is a detailed schematic block diagram of a scanning circuit according to an embodiment of the present disclosure, the gating module 300 includes three output modules.

Two of the output modules respectively include a second NAND gate 312 and a second NAND gate 313, and the other output module includes an output port. The second NAND gate 312 outputs a scanning signal SCAN1 to a pixel circuit of a pixel cell, the second NAND gate 313 outputs a scanning signal SCAN2 to the pixel circuit of the pixel cell, and the output port outputs a scanning signal EMIT to the pixel circuit of the pixel cell. A second input end of the second NAND gate 312 is electrically connected to a third clock signal end CK3, and a second input end of the second NAND gate 313 is electrically connected to a fourth clock signal end CK4.

Referring to FIG. 3a, the pixel circuit is scanned with the scanning signal SCAN1, the scanning signal SCAN2 and the scanning signal EMIT which are outputted by the scanning circuit. The scanning signal SCAN1 is generally for controlling the pixel circuit to complete a resetting process, the scanning signal SCAN2 is generally for controlling to write a data signal into the pixel circuit, and the scanning signal EMIT is generally for controlling the pixel circuit to be electrically connected to a light emitting diode, so as to be further electrically connected to a cathode low potential, which is the same as the conventional technologies.

Figure 3B:
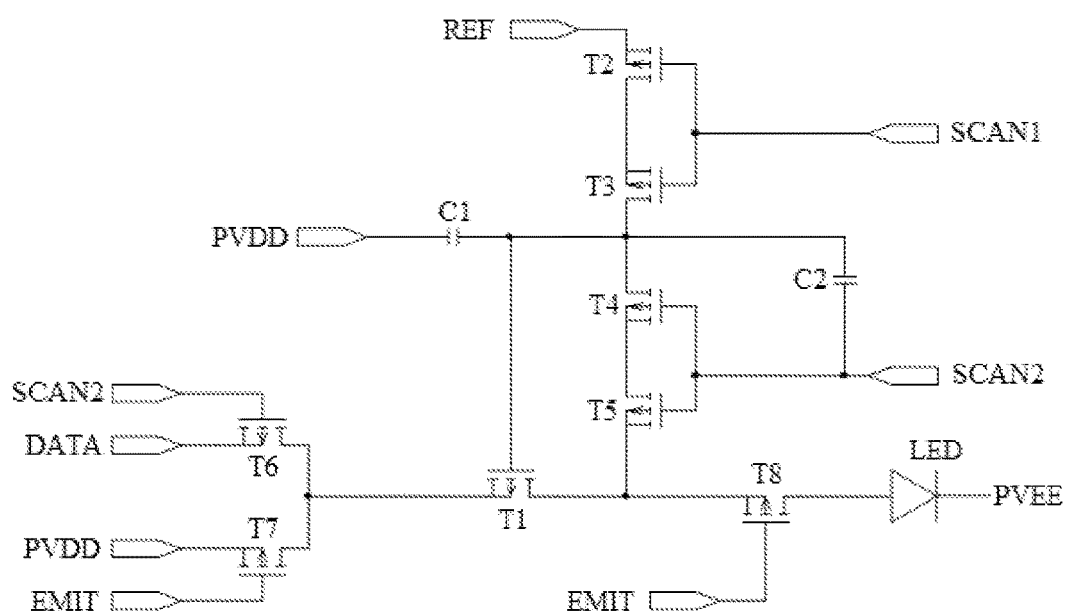
FIG. 3b is a schematic block diagram of a pixel circuit according to an embodiment of the present disclosure.

Reference is made to FIG. 3b, which is a schematic block diagram of a pixel circuit according to an embodiment of the present disclosure. The pixel circuit is a typical 8T2C pixel circuit including 8 thin film transistors, i.e., a first transistor T1 to an eighth transistor T8, and 2 capacitors, i.e., a first capacitor C1 and a second capacitor C2. In the reset process, in the case that the seventh transistor T7 and the eighth transistor T8 are switched on under the control of the scanning signal EMIT, the eighth transistor T8 can connect the pixel circuit to the light emitting diode LED, so as to further connect the pixel circuit to a cathode low potential PVEE, thereby resetting the pixel circuit. In a light emitting process, the first transistor T1 is in an on state. In a case that the seventh transistor T7 and the eighth transistor T8 are switched on under the control of the scanning signal EMIT, the seventh transistor T7, the eighth transistor T8 and the first transistor T1 together connects an anode voltage PVDD to the cathode low potential PVEE through the light emitting diode LED, thereby making the light emitting diode LED emit light.

In a case that the second transistor T2 and the third transistor T3 are switched on under the control of the scanning signal SCAN1, a reference signal REF can be transmitted to a gate of the transistor T1 of the pixel circuit, and thus the pixel circuit is reset (that is the gate of the first transistor T1 is reset). In addition, the fourth transistor T4, the fifth transistor T5 and the sixth transistor T6 are switched on under the control of the scanning signal SCAN2 to ensure that a data signal DATA is normally transmitted to the first transistor T1, that is, is written into the pixel circuit.

Figure 4:
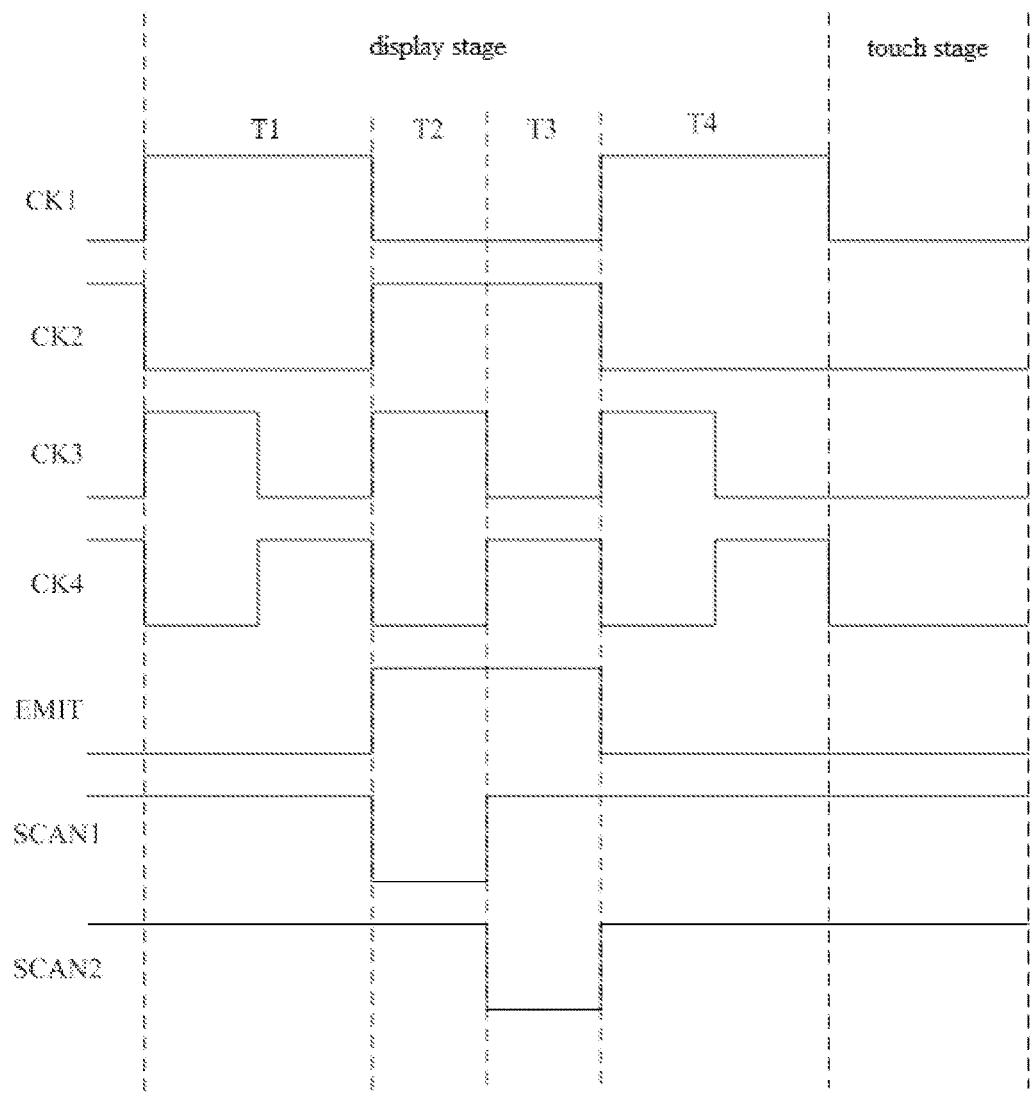
FIG. 4 is a timing diagram according to an embodiment of the present disclosure.

A working process of the scanning circuit corresponding to FIG. 3a is described in detail with reference to a timing diagram. The following description is made by taking a p-type thin film transistor as the transistor in the pixel circuit. Clock signals outputted respectively from the first clock signal end CK1 and the second clock signal end CK2 have opposite phases, and clock signals outputted respectively from the third clock signal end CK3 and the fourth clock signal end CK4 have opposite phases. Reference is made to FIG. 4, which is a timing diagram according to an embodiment of the present disclosure. a driving process is divided in two phases: a display stage and a touch stage. In the figure, a display stage includes a first stage T1, a second stage T2, a third stage T3 and a fourth stage T4. The working process is described as follows with reference to FIG. 3a and FIG. 4.

In the first stage T1, a high-level starting signal STV is inputted to the input end of the first clock inverter CKINV1 of the input module 100. In this case, a high-level signal is outputted from the first clock signal end CK1 and is converted into a low-level signal by the first inverter INV1, and then the first clock inverter CKINV1 is switched on under the control of the high-level signal and low-level signal. The starting signal STV is converted into a low-level signal and outputted by the first clock inverter CKINV1. Then, the low-level signal output from the first clock inverter CKINV1 is converted into a high-level starting signal STV and outputted by the second inverter INV2.

At this stage, a low-level signal is outputted from the second clock inverter CKINV2. The low-level signal and the high-level starting signal STV outputted from the second inverter INV2 are processed by the first NAND gate 311 to generate a high-level signal. The generated high-level signal is processed by the third inverter INV3 to generate a low-level signal. The generated low-level signal is outputted via the output port as the scanning signal EMIT to control the pixel circuit to reset. In addition, the low-level signal outputted from the third inverter INV3 is converted into high-level signals by the second NAND gate 312 and the second NAND gate 313, that is, the scanning signals SCAN1 and SCAN2 are high-level signals for switching off the thin film transistors respectively connected to the second NAND gate 312 and the second NAND gate 313.

In the second stage T2, the first clock signal end CK1 outputs a low-level signal to switch on the second clock inverter CKINV2. The starting signal STV is latched cyclically by the second clock inverter CKINV2 and the second inverter INV2. At this time, the second clock signal end CK2 outputs a high-level signal to make the first NAND gate 311 output a low-level signal which is then converted into a high-level signal by the third inverter INV3. The high level signal is outputted via the output port as the scanning signal EMIT which switches off a thin film transistor connected to the output port. At this time, the third clock signal end CK3 outputs a high-level signal to make the second NAND gate 312 output a low-level scanning signal SCAN1 to reset the pixel circuit. The fourth clock signal end CK4 outputs a low-level signal to make the second NAND gate 313 output a high-level signal as the scanning signal SCAN2.

In the third stage T3, the first clock signal end CK1 keeps outputting the low level signal. The electrical level of the scanning signal EMIT is the same as that in the second stage T2. The third clock signal end CK3 outputs a low-level signal to make the second NAND gate 312 output a high-level signal as the scanning signal SCAN1, and the fourth clock signal end CK4 outputs a high-level signal to make the second NAND gate 313 output a low-level scanning signal SCAN2, to write a data signal into the pixel circuit.

In the fourth stage T4, the first clock signal end CK1 outputs a high-level signal. The first clock inverter CKINV1 converts an inputted low-level signal into a high-level signal and outputs the high-level signal. The high level signal is then converted into a low-level signal by the second inverter INV2. The low-level signal is converted into a high-level signal by the first NAND gate 311, and then is converted into a low-level signal again and outputted by the third inverter INV3. In this case, the scanning signal EMIT is the low-level signal which controls the pixel circuit to be electrically connected to the light emitting diode and further to be electrically connected to the cathode low potential to make the light emitting diode emit light.

In the touch stage, the timing sequence for the scanning display is suspended. That is to say, since the latch module 200 outputs a low-level signal after the scanning circuit completes the display scanning stage, in a case that the first clock signal end CK1 to the fourth clock signal end CK4 are all controlled to be suspended in the touch stage (i.e., outputting a low-level signal when controlling the timing sequence for the display scanning to be suspended), an output signal output from the third inverter INV3 is still a low-level signal. In this case, the second NAND gate 312 and the second NAND gate 313 keep outputting high-level signals, and the scanning signal EMIT is the low-level signal so as to keep the electrical connection between the pixel circuit and the light emitting diode, to make the light emitting diode emit light normally and ensure the touch display device to display normally in the touch stage.

Furthermore, in order to improve a driving capability of the scanning signal, the output module according to the embodiment of the present disclosure further includes at least one buffer unit.

The buffer unit is electrically connected between the second NAND gate and the pixel row driven by the scanning circuit, or between the output port and the pixel row driven by the scanning circuit, or respectively between the second NAND gate and the pixel row driven by the scanning circuit and between the output port and the pixel row driven by the scanning circuit.

Figure 3C:
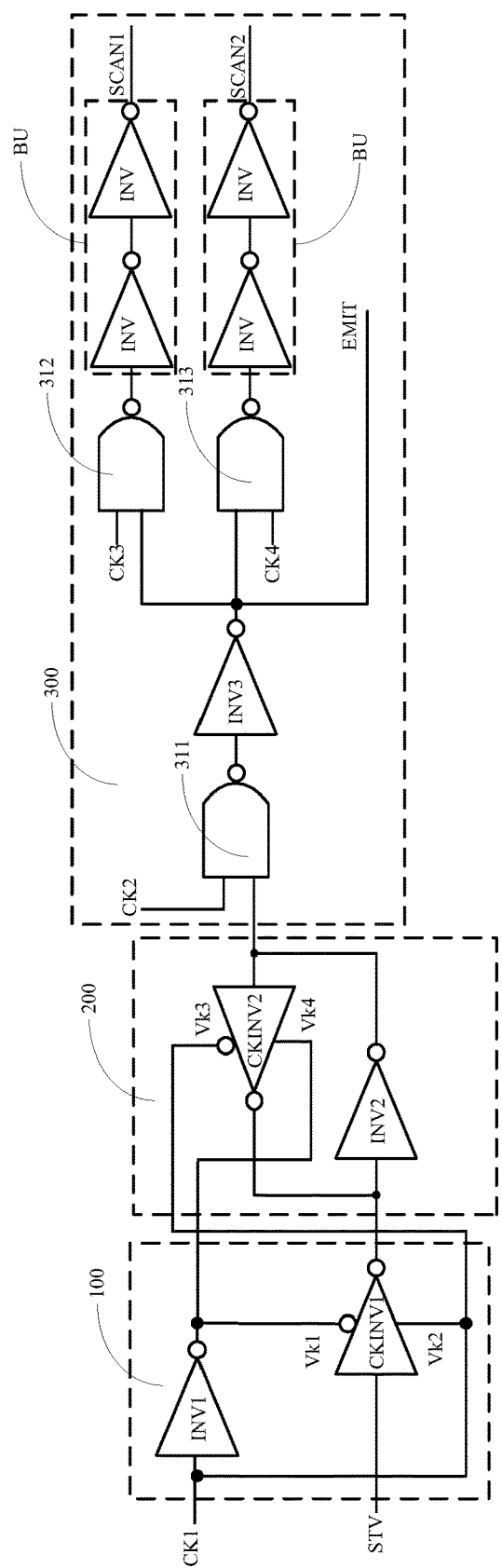
FIG. 3c is a schematic block diagram of a scanning circuit according to an embodiment of the present disclosure.
Figure 3D:
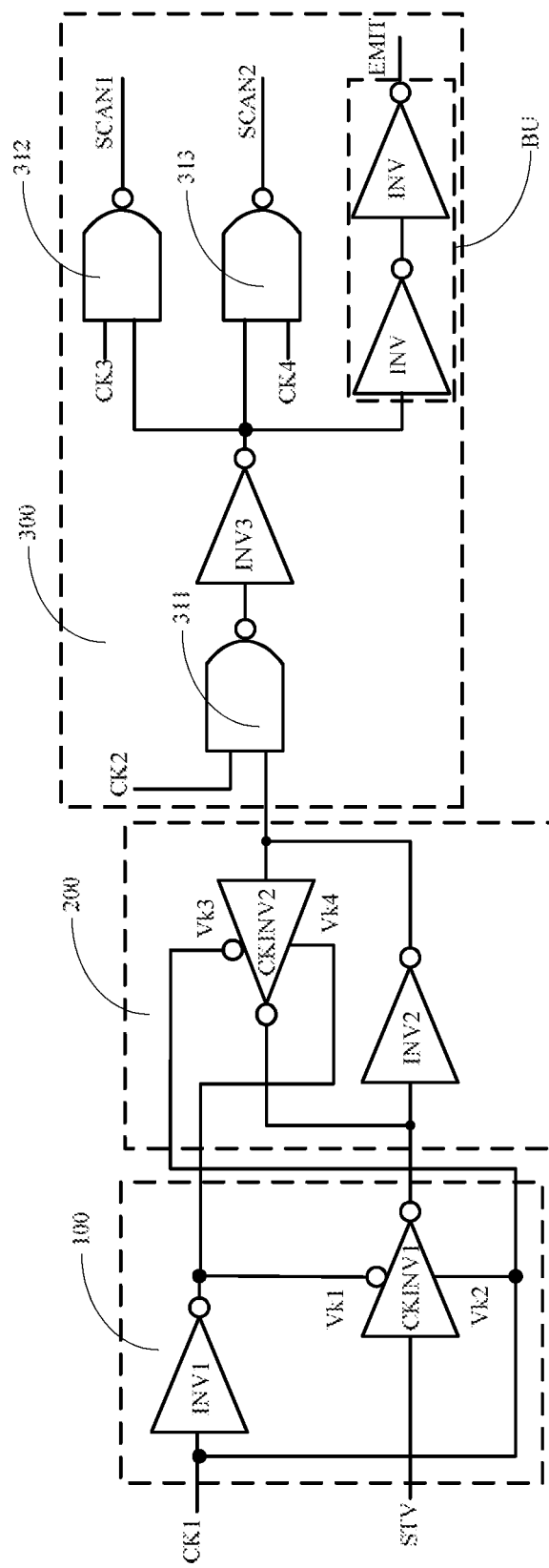
FIG. 3d is a schematic block diagram of a scanning circuit according to an embodiment of the present disclosure.
Figure 3E:
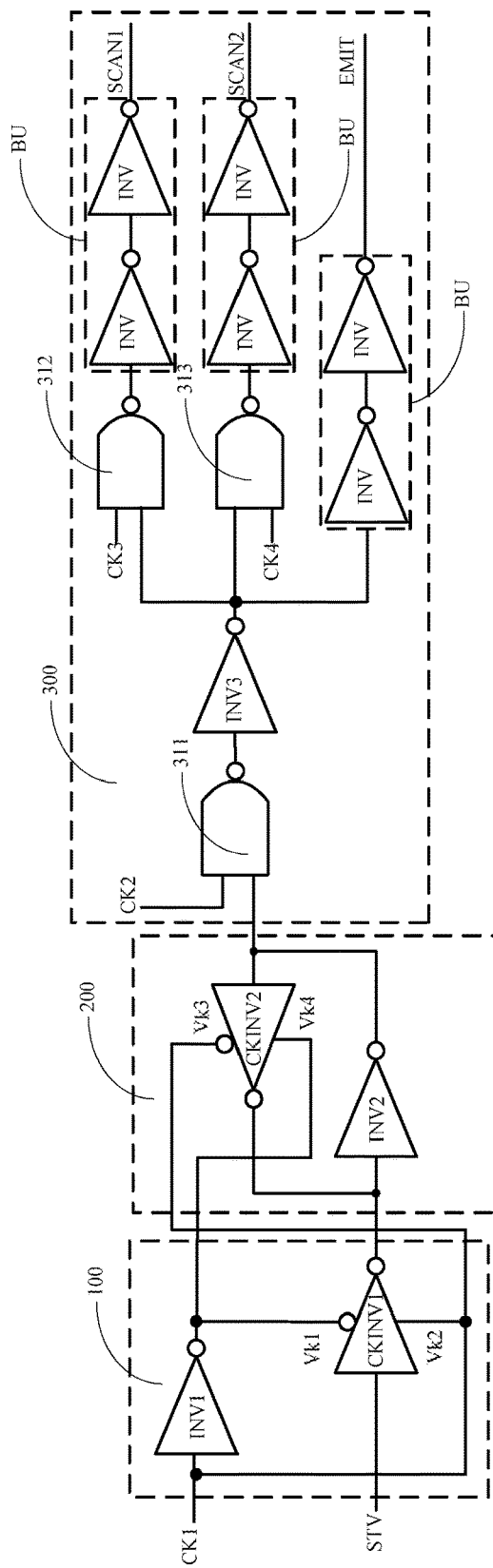
FIG. 3e is a schematic block diagram of a scanning circuit according to an embodiment of the present disclosure.

Normally, each buffer unit is formed by an even number of inverters connected in series. As shown in FIGS. 3c to 3e, each buffer unit BU is formed by two inverters INV connected in series. In FIG. 3c, a buffer unit BU is electrically connected between the second NAND gate 312 and the pixel row driven by the scanning circuit, and a buffer unit BU is electrically connected between the second NAND gate 313 and the pixel row driven by the scanning circuit. In FIG. 3d, a buffer unit BU is electrically connected between the output port and the pixel row driven by the scanning circuit. In FIG. 3e, a buffer unit BU is electrically connected between the second NAND gate 312 and the pixel row driven by the scanning circuit, a buffer unit BU is electrically connected between the second NAND gate 313 and the pixel row driven by the scanning circuit, and a buffer unit BU is electrically connected between the output port and the pixel row driven by the scanning circuit.

In an embodiment of the present disclosure, the gating module may have other structures. For example, the gating module according to the embodiment of the present disclosure includes at least one three-input NAND gate and/or at least one third NAND gate, at least one fourth inverter and a gating clock signal end.

In the case that the gating module includes the three-input NAND gate, a first input end of the three-input NAND gate is electrically connected to the latch module, a second input end of the three-input NAND gate is electrically connected to a clock signal end, and a third input end of the three-input NAND gate is electrically connected to the gating clock signal end.

In the case that the gating module includes the third NAND gate, a first input end of the third NAND gate is electrically connected to the latch module, the second input end of the third NAND gate is electrically connected to the gating clock signal end, an output end of the third NAND gate is electrically connected to an input end of the fourth inverter, and the third NAND gate corresponds to the fourth inverter in a one-to-one manner.

Figure 5:
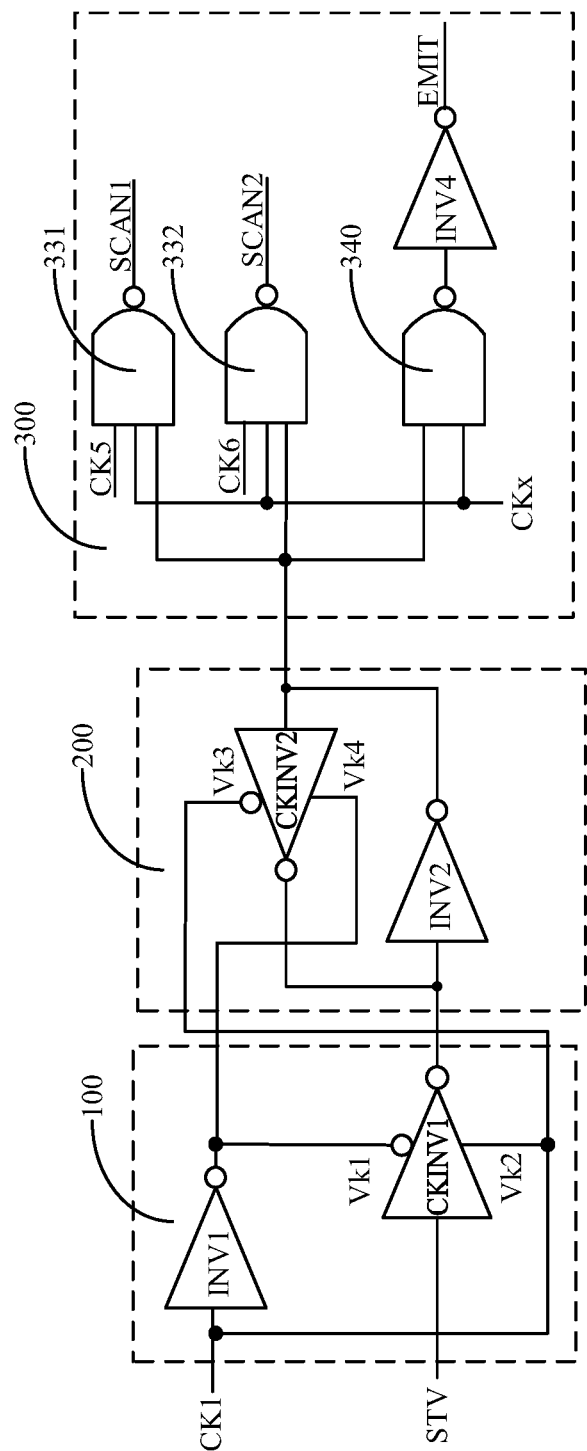
FIG. 5 is a schematic block diagram of a scanning circuit according to an embodiment of the present disclosure.

In the following, the scanning circuit and gating module according to the embodiment of the present disclosure are described in detail by taking a scanning circuit of an organic electro-luminescent display device as an example. Reference is made to FIG. 5, which is a detailed schematic block diagram of a scanning circuit according to an embodiment of the present disclosure. The gating module 300 includes: a three-input NAND gate 331, a three-input NAND gate 332, a third NAND gate 340, a fourth inverter INV4 and a gating clock signal end CKx.

A first input end of the three-input NAND gate 331 and a first input end of the three-input NAND gate 332 are electrically connected to the latch module 200, a second input end of the three-input NAND gate 331 is electrically connected to a fifth clock signal end CK5, a second input end of the three-input NAND gate 332 is electrically connected to a sixth clock signal port CK6, and a third input end of the three-input NAND gate 331 and a third input end of the three-input NAND gate 332 are electrically connected to the gating clock signal end CKx.

A first input end of the third NAND gate 340 is electrically connected to the latch module 200, a second input end of the third NAND gate 340 is electrically connected to the gating clock signal port CKx, and an output end of the third NAND gate 340 is electrically to an input end of the fourth inverter INV4. An output signal of the three-input NAND gate 331 is the scanning signal SCAN1, an output signal of the three-input NAND gate 332 is the scanning signal SCAN2 and an output signal of the fourth inverter INV4 is the scanning signal EMIT.

Figure 6:
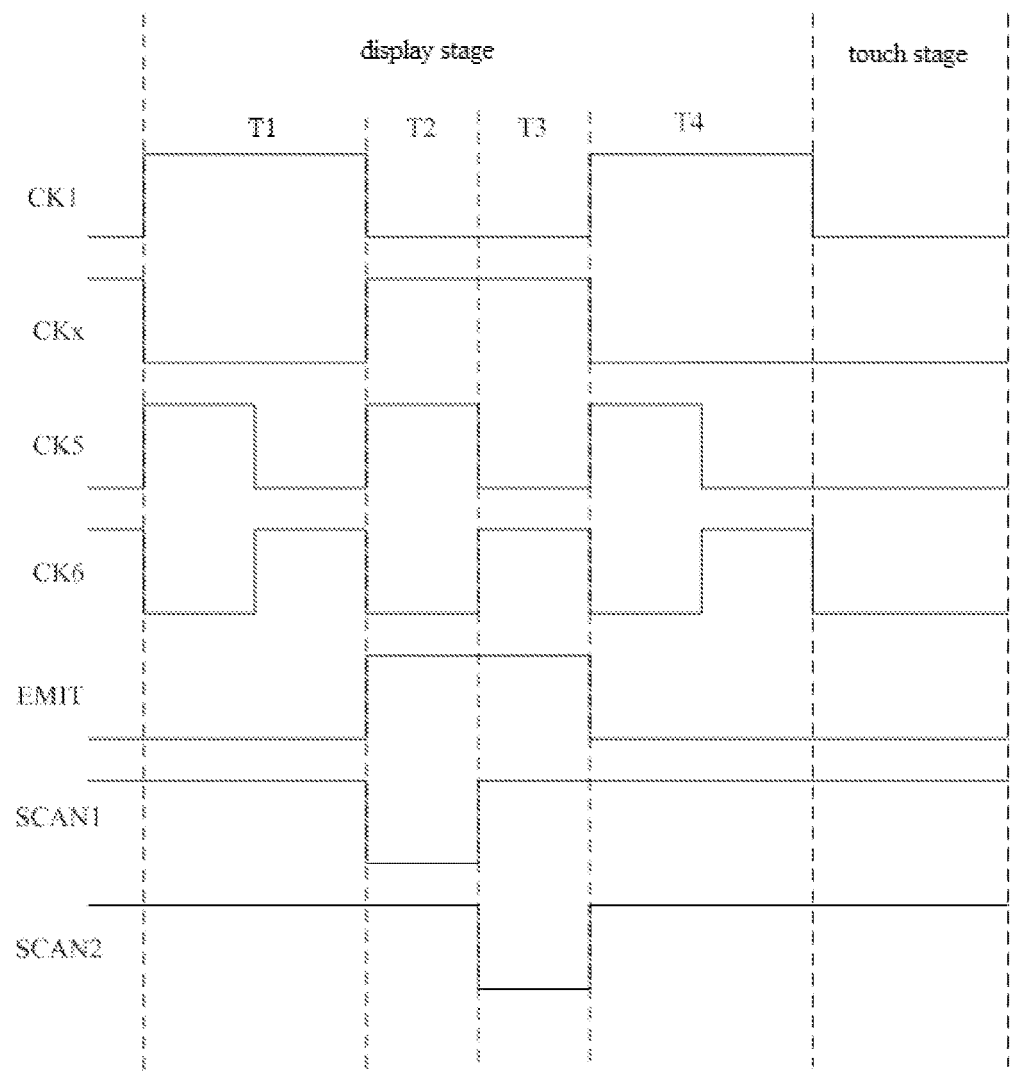
FIG. 6 is a timing diagram according to an embodiment of the present disclosure.

Hereinafter, a timed working process of the scanning circuit shown in FIG. 5 is described in detail with reference to the timing diagram. It should be noted that the pixel circuit of the pixel cells according to the present disclosure is the same as that in the conventional technologies, and is not described herein. In addition, in the following description, the working process is illustrated by taking a p-type thin film transistor as the transistor in the pixel circuit. A clock signal outputted from the first clock signal end CK1 and a clock signal outputted from the gating clock signal end CKx have opposite phases, and a clock signal outputted from a fifth clock signal end CK5 and a clock signal outputted from a sixth clock signal end CK6 have opposite phases. Reference is made to FIG. 6, which is a timing diagram according to an embodiment of the present disclosure. In FIG. 6, a driving process is divided into a display stage and a touch stage. The display stage includes a first stage T1, a second stage T2, a third stage T3 and a fourth stage T4. The working process is described with reference to FIG. 5 and FIG. 6.

In the first stage T1, a high-level starting signal STV is inputted to the input end of the first clock inverter CKINV1 of the input module 100. A high-level signal is outputted from the first clock signal end CK1 and is converted into a low-level signal by the first inverter INV1. And then the first clock inverter CKINV1 is switched on under the control of the high-level signal and the low-level signal. In this case, the starting signal STV is converted into a low-level signal and is outputted by the first clock inverter CKINV1, and then the low-level signal outputted from the first clock inverter CKINV1 is outputted by the second inverter INV2 as a high-level starting signal STV.

In this stage, the gating clock signal end CKx outputs a low-level signal, thus the three-input NAND gate 331, the three-input NAND gate 332 and the third NAND gate 340 respectively output high-level signals. In this case, the scanning signals SCAN1 and SCAN2 are both high-level signals. After receiving the high-level signal transmitted from the third NAND gate 340, the fourth inverter INV4 outputs a low-level signal as the scanning signal EMIT, to control the pixel circuit to be reset.

In the second stage T2, the first clock signal end CK1 outputs a low-level signal to control the second clock inverter CKINV2 to be switched on. The starting signal STV is latched cyclically by the second clock inverter CKINV2 and the second inverter INV2. The gating clock signal end CKx outputs a high-level signal, so that the third NAND gate 340 outputs a low-level signal which is then converted into a high-level scanning signal and outputted by the fourth inverter INV4 as the scanning signal EMIT. The fifth clock signal end CK5 outputs a high-level signal, so that the three-input NAND gate 331 outputs a low-level scanning signal SCAN1, to reset the pixel circuit. The sixth clock signal end CK6 outputs a low-level signal, so that the three-input NAND gate 332 outputs a high-level signal as the scanning signal SCAN2.

In the third stage T3, the first clock signal end CK1 keeps outputting the low-level signal, the electrical level of the scanning signal EMIT is the same as that in the second stage T2. The fifth clock signal end CK5 outputs a low-level signal, so that the three-input NAND gate 331 outputs a high-level signal as the scanning signal SCAN1. The sixth clock signal end CK6 outputs a high-level signal, so that the three-input NAND gate 332 outputs a low-level scanning signal SCAN2, to write a data signal into the pixel circuit.

In the fourth stage T4, the first clock signal end CK1 outputs a high-level signal. The first clock inverter CKINV1 converts an inputted low-level signal into a high-level signal and outputs the high-level signal. This high-level signal is converted into a low-level signal and outputted by the second inverter INV2. The low-level signal controls the three-input NAND gate 331, the three-input NAND gate 332 and the third NAND gate 340 to each output a high-level signal. The high-level signal is inversed in phase by the fourth inverter INV4 to output a low-level signal as the scanning signal EMIT. In this case, the pixel circuit is controlled to be electrically connected to the light emitting diode and is further electrically connected to the cathode low potential to make the light emitting diode emit light.

In the touch stage, the timing sequence for the scanning display is suspended. That is to say, since the latch module 200 outputs the low-level signal after the scanning circuit completes the display scanning stage, in a case that the first clock signal end CK1, the gating clock signal clock CKx, the fifth clock signal end CK5 and the sixth clock signal end CK6 are all controlled to be suspended in the touch stage (i.e., the timing sequence for the scanning display is controlled to be suspended), the three-input NAND gate 331, the three-input NAND gate 332 and the third NAND gate 340 each output a high-level signal. The high-level signal is inversed into a low-level signal and outputted by the fourth inverter INV4 as the scanning signal EMIT. In this case, the pixel circuit is kept to be connected to the light emitting diode to make the light emitting diode emit light normally, so as to ensure the normal display of the touch display device in the touch stage.

It should be noted that the structure of the scanning circuit according to the embodiments of the present disclosure is not limited to the above two circuit structures. In other embodiments, the scanning circuit may have other circuit structures, which is not limited herein.

Accordingly, a drive circuit is further provided according to an embodiment of the present disclosure. The drive circuit is applied in a touch display device including multiple pixel rows. The drive circuit includes multiple stages of the above scanning circuits.

The scanning circuits correspond to the pixel rows in a one-to-one manner.

Figure 7:
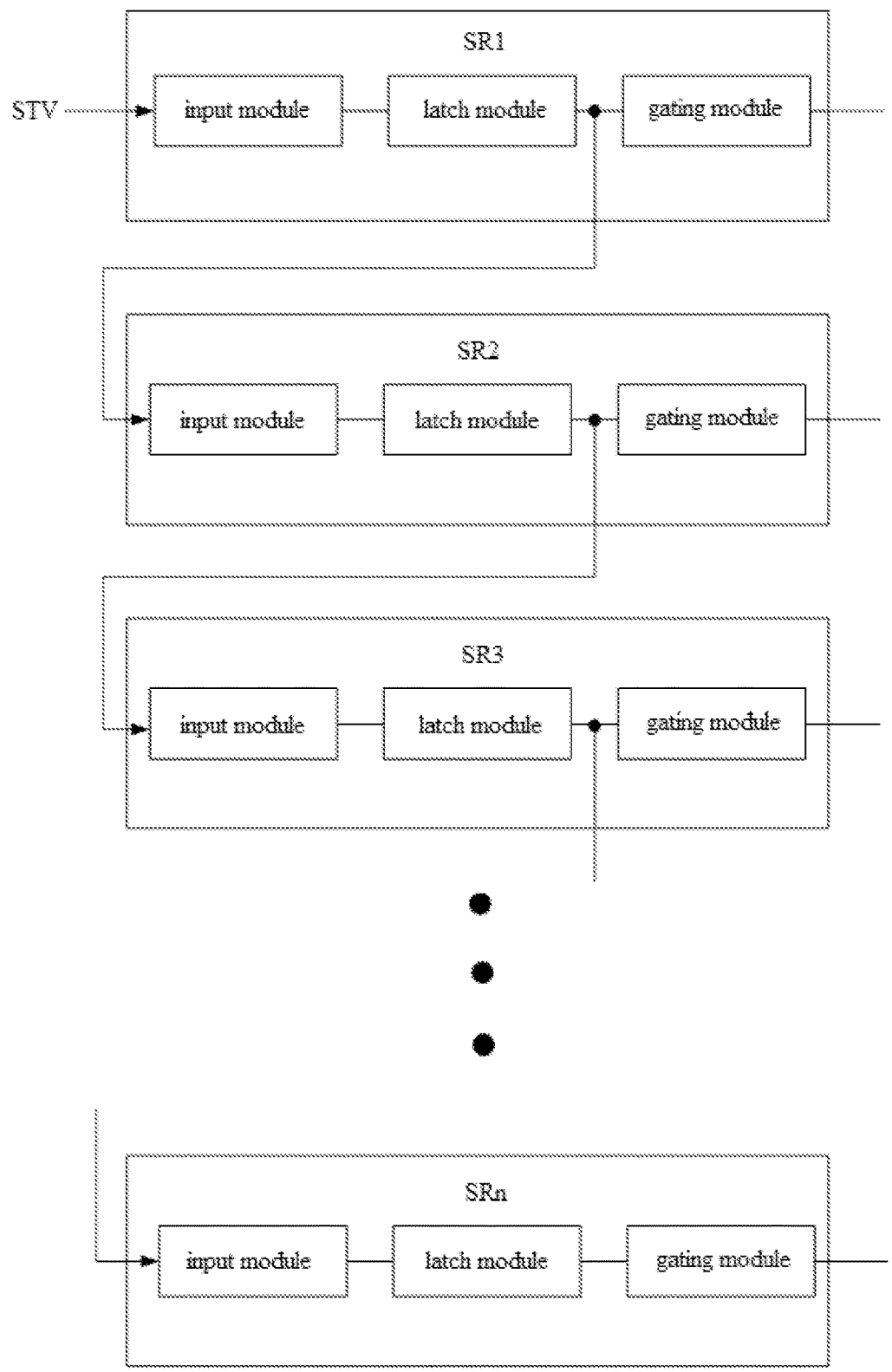
FIG. 7 is a schematic block diagram of a drive circuit according to an embodiment of the present disclosure.

Reference is made to FIG. 7 which is a schematic block diagram of a drive circuit according to an embodiment of the present disclosure. The drive circuit includes multiple stages of scanning circuits SR1 to SRn. An output of a latch module of each stage of scanning circuit is electrically connected to an input of an input module of the next stage of scanning circuit.

An input of an input module of the first stage of scanning circuit SR1 is connected to the starting signal STV.

Accordingly, a touch display device is further provided according to an embodiment of the present disclosure. The touch display device includes the above drive circuit.

Figure 8:
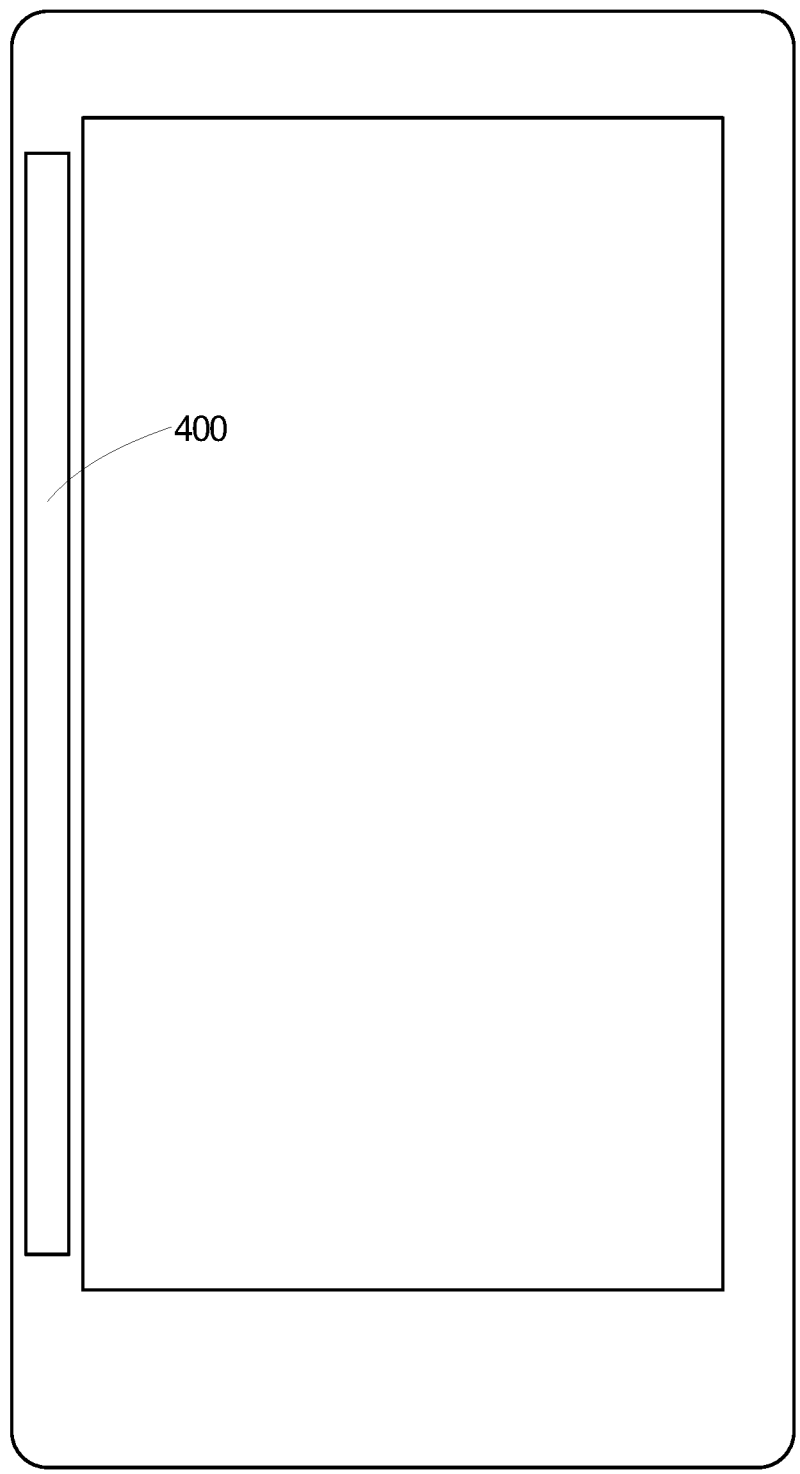
FIG. 8 is a schematic diagram of a touch display device according to an embodiment of the present disclosure.

Reference is made to FIG. 8, which is a schematic block diagram of a touch display device according to an embodiment of the present disclosure. The touch display device includes a drive circuit 400 arranged in a frame region of the touch display device.

Figure 9:
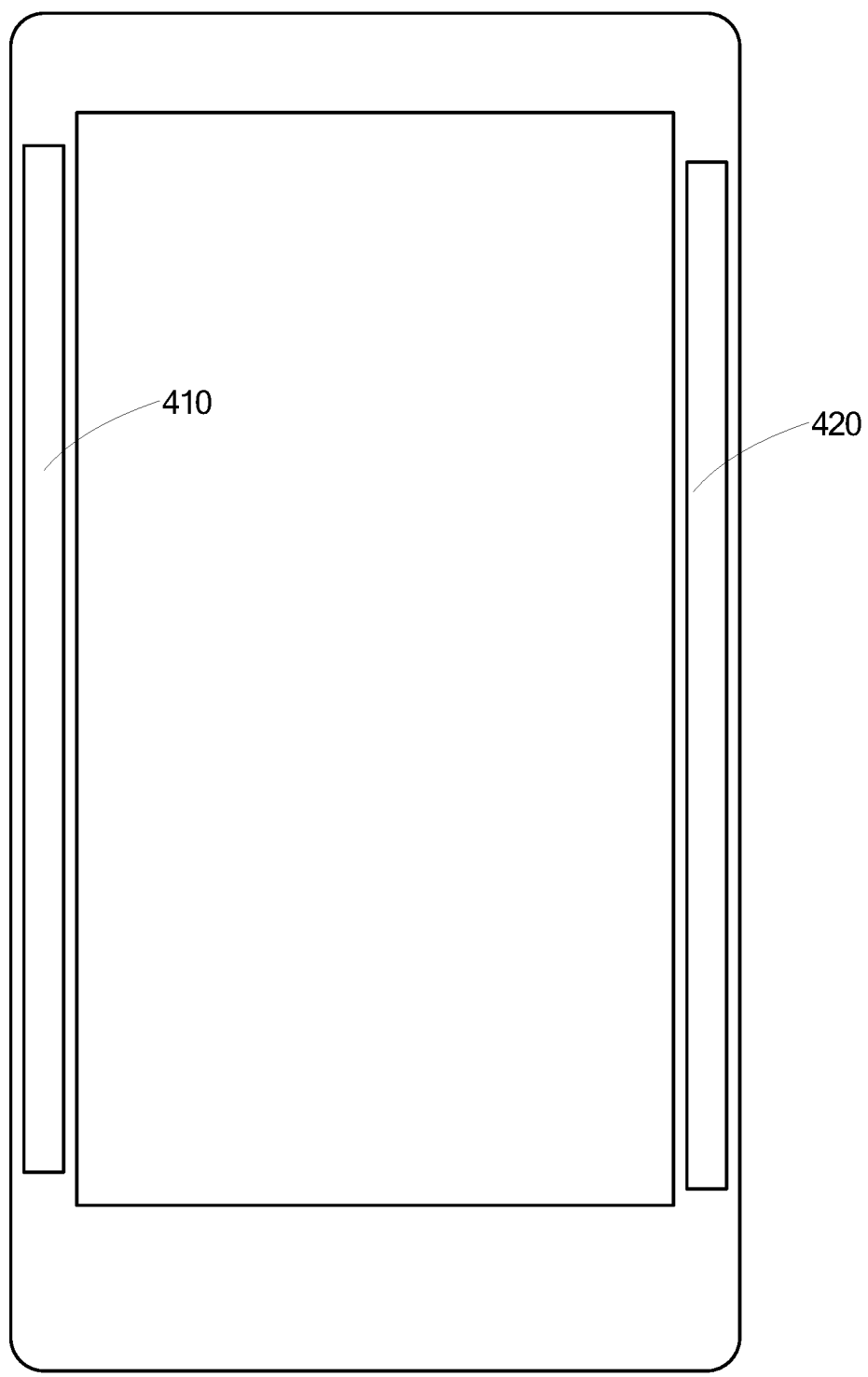
FIG. 9 is a schematic diagram of a touch display device according to an embodiment of the present disclosure.

Furthermore, the drive circuit according to the embodiments of the present disclosure may be further divided into two drive sub-circuits respectively arranged in two opposite sides of the frame region of the touch display device, thereby realizing a slim frame design. Reference is made to FIG. 9 which is a schematic block diagram of a touch display device according to an embodiment of the present disclosure. As shown in the figure, the touch display device includes the drive circuit, and the drive circuit is divided into a first drive sub-circuit 410 and a second drive sub-circuit 420, which are arranged on opposite sides of a frame region of the touch display device.

In the embodiment, the first drive sub-circuit may be configured to scan a pixel row in an odd stage and the second drive sub-circuit may be configured to scan a pixel row in an even stage, which is not limited herein and is designed based on actual applications.

A scanning circuit, a drive circuit and a touch display device are provided according to the embodiments of the present disclosure. The touch display device includes multiple pixel rows, and the scanning circuit corresponds to one of the pixel rows. The scanning circuit includes an input module configured to generate a scanning signal in response to an inputted starting signal, a latch module electrically connected to the input module and configured to generate a starting signal in response to the scanning signal and latch the starting signal, and a gating module electrically connected to the latch module and configured to perform a display scanning on the pixel row driven by the scanning circuit under the control of the starting signal in a display stage and suspend the display scanning on the pixel row driven by the scanning circuit under the control of the starting signal in a touch stage. As can be seen from the above, in the technical solutions according to the embodiments of the present disclosure, by arranging the gating module in the scanning circuit, the scanning circuit performs the display scanning on the pixel row under the control of the starting signal in a display stage and suspends the display scanning on the pixel row under the control of the starting signal in the touch stage, so as to ensure that the display scanning is suspended by the scanning circuit in the touch stage and ensure a normal display of the touch display device.

According to the above description of the disclosed embodiments, those skilled in the art can implement or practice the present disclosure. Many changes to these embodiments are possible for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

What is claimed is:

1. A scanning circuit, which is applied in a touch display device comprising a plurality of pixel rows, the scanning circuit corresponding to one of the plurality of pixel rows, and comprising:
   an input module, configured to generate a scanning signal in response to an inputted starting signal, comprising:
      a first clock inverter, wherein an input end of the first clock inverter is inputted with the inputted starting signal, an output end of the first clock inverter is electrically connected to the latch module, a first control end of the first clock inverter is inputted with a first control signal and a second control end of the first clock inverter is inputted with a second control signal, with the first control signal and the second control signal having opposite electrical levels; and
      a first inverter, wherein an input end of the first inverter and the second control end of the first clock inverter are both electrically connected to a first clock signal end, and an output end of the first inverter is electrically connected to the first control end of the first clock inverter;
   a latch module, electrically connected to the input module and configured to generate and latch a starting signal the same as the inputted starting signal in response to the scanning signal, wherein the latch module comprises a second inverter and a second clock inverter, wherein an input end of the second inverter and an output end of the second clock inverter are both electrically connected to the input module, an output end of the second inverter and an input end of the second clock inverter are both electrically connected to the gating module, a first control end of the second clock inverter is inputted with a third control signal and a second control end of the second clock inverter is inputted with a fourth control signal, with the third control signal and the fourth control signal having opposite electrical levels; and
   a gating module, electrically connected to the latch module and configured to perform a display scanning on the pixel row corresponding to the scanning circuit under a control of the starting signal in a display stage and suspend the display scanning on the pixel row corresponding to the scanning circuit under the control of the starting signal in a touch stage;
   wherein the first control end of the second clock inverter is electrically connected to a first clock signal end, the second control end of the second clock inverter is electrically connected to an output end of the first inverter, and the first control end of the second clock inverter and a first control end of a first clock inverter have a same active control level, and the second control end of the second clock inverter and a second control end of the first clock inverter have a same active control level.

2. The scanning circuit according to claim 1, wherein
the gating module comprises at least one three-input NAND gate and a gating clock signal end; and
a first input end of the three-input NAND gate is electrically connected to the latch module, a second input end of the three-input NAND gate is electrically connected to a clock signal end and a third input end of the three-input NAND gate is electrically connected to the gating clock signal end.

3. The scanning circuit according to claim 1, wherein
the gating module comprises at least one third NAND gate, at least one fourth inverter and a gating clock signal end; and
a first input end of the third NAND gate is electrically connected to the latch module, a second input end of the third NAND gate is electrically connected to the gating clock signal end, an output end of the third NAND gate is electrically to an input end of the fourth inverter and the third NAND gate corresponds to the fourth inverter in a one-to-one manner.

4. A scanning circuit, which is applied in a touch display device comprising a plurality of pixel rows, the scanning circuit corresponding to one of the plurality of pixel rows, and comprising:
an input module, configured to generate a scanning signal in response to an inputted starting signal;
a latch module, electrically connected to the input module and configured to generate and latch a starting signal the same as the inputted starting signal in response to the scanning signal; and
a gating module, electrically connected to the latch module and configured to perform a display scanning on the pixel row corresponding to the scanning circuit under a control of the starting signal in a display stage and suspend the display scanning on the pixel row corresponding to the scanning circuit under the control of the starting signal in a touch stage;
wherein the gating module comprises a first NAND gate, a third inverter and at least one output module, a first input end of the first NAND gate is electrically connected to the latch module, a second input end of the first NAND gate is electrically connected to a second clock signal end, an output end of the first NAND gate is electrically connected to an input end of the third inverter, an output end of the third inverter is electrically connected to the output module, and the output module is electrically connected to the pixel row corresponding to the scanning circuit;
wherein the output module comprises a second NAND gate, a first input end of the second NAND gate is electrically connected to the output end of the third inverter, a second input end of the second NAND gate is electrically connected to a clock signal end, and an output end of the second NAND gate is electrically connected to the pixel row corresponding to the scanning circuit; or wherein the output module includes an output port electrically connected between the output end of the third inverter and the pixel row corresponding to the scanning circuit.

5. The scanning circuit according to claim 4, wherein
the output module further comprises a buffer unit electrically connected between the second NAND gate and the pixel row corresponding to the scanning circuit.

6. The scanning circuit according to claim 4, wherein
the output module further comprises a buffer unit electrically connected between the output port and the pixel row corresponding to the scanning circuit.

7. The scanning circuit according to claim 4, wherein
the output module further comprises a buffer unit electrically connected between the second NAND gate and the pixel row corresponding to the scanning circuit, and a buffer unit electrically connected between the output port and the pixel row corresponding to the scanning circuit.

8. A scanning circuit, which is applied in a touch display device comprising a plurality of pixel rows, the scanning circuit corresponding to one of the plurality of pixel rows, and comprising:
an input module, configured to generate a scanning signal in response to an inputted starting signal;
a latch module, electrically connected to the input module and configured to generate and latch a starting signal the same as the inputted starting signal in response to the scanning signal; and
a gating module, electrically connected to the latch module and configured to perform a display scanning on the pixel row corresponding to the scanning circuit under a control of the starting signal in a display stage and suspend the display scanning on the pixel row corresponding to the scanning circuit under the control of the starting signal in a touch stage;
wherein the gating module comprises at least one three-input NAND gate, at least one third NAND gate, at least one fourth inverter and a gating clock signal end, a first input end of the three-input NAND gate is electrically connected to the latch module, a second input end of the three-input NAND gate is electrically connected to a clock signal end and a third input end of the three-input NAND gate is electrically connected to the gating clock signal end, a first input end of the third NAND gate is electrically connected to the latch module, a second input end of the third NAND gate is electrically connected to the gating clock signal end, and an output end of the third NAND gate is electrically to an input end of the fourth inverter and the third NAND gate corresponds to the fourth inverter in a one-to-one manner.

* * * * *